(12) United States Patent
Lin

(10) Patent No.: US 6,220,316 B1
(45) Date of Patent: Apr. 24, 2001

(54) REPOSITIONABLE SUPPORTING APPARATUS FOR A WORKPIECE FEEDING DEVICE

(75) Inventor: Ching-Chi Lin, No. 473, San-Feng Rd., Hou-Li Hsiang, Taichung Hsien (TW)

(73) Assignee: Ching-Chi Lin, Taichung Hsien (TW)

( * ) Notice: Subject to any disclaimer, the term of this patent is extended or adjusted under 35 U.S.C. 154(b) by 0 days.

(21) Appl. No.: 09/512,147

(22) Filed: Feb. 23, 2000

(51) Int. Cl.$^7$ ............................................. B27B 31/00
(52) U.S. Cl. ................................ 144/242.1; 144/245.1; 144/253.1
(58) Field of Search ......................... 144/242.1, 245.1, 144/253.1, 253.2, 253.6; 83/486.1; 269/70, 77, 78; 285/91, 404, 407; 403/109.1, 110, 377

(56) References Cited

U.S. PATENT DOCUMENTS

| | | | |
|---|---|---|---|
| 2,631,618 | * | 3/1953 | Aruidson ............................ 144/242.1 |
| 6,142,699 | * | 11/2000 | Pao ..................................... 403/109.5 |

FOREIGN PATENT DOCUMENTS

| | | | |
|---|---|---|---|
| 344835 | * | 4/1960 | (CH) .................................. 144/245.1 |
| 597342 | * | 8/1959 | (IT) .................................... 144/242.1 |
| 55-112745 | * | 8/1980 | (JP) .................................... 144/242.1 |

* cited by examiner

*Primary Examiner*—Ed Tolan
(74) *Attorney, Agent, or Firm*—Christensen O'Connor Johnson Kindness PLLC

(57) ABSTRACT

A repositionable supporting apparatus includes a lower post adapted to be fixed on a worktable. An upper post is disposed co-axially rotatable relative to the lower post, and has a downward abutment wall defining an upper cavity, and an anchored end portion connected to an anchoring end of a cantilever member. The cantilever member has a holding end opposite to the anchoring end in a direction radial to the upper post for carrying a workpiece feeding device. A coupling member couples the lower post with the upper post in both retained and released positions where the upper post is prevented from rotation and is rotatable relative to the lower post respectively, and has an upward abutment wall to slidably contact the downward abutment wall such that a lower cavity therein can be aligned and communicated with the upper cavity. A spring biased tumbler pin is disposed in and is movable relative to the lower cavity between a locked position where the tumbler pin protrudes into tne upper cavity, and an unlocked position where the tumbler pin is retracted by depression of a depressing member to be flush with the upward abutment wall so as to permit sliding movement of the downward abutment wall, thereby moving the workpiece feeding device away from a cutting tool on the worktable so as not to interfere with replacement of the cutting tool.

7 Claims, 8 Drawing Sheets

REPOSITIONABLE SUPPORTING APPARATUS FOR A WORKPIECE FEEDING DEVICE

BACKGROUND OF THE INVENTION

1. Field of the Invention

This invention relates to a workpiece feeding device used to feed a workpiece along a work path on a worktable for a cutting tool to work thereon, more particularly to a repositionable supporting apparatus for a workpiece feeding device.

2. Description of the Related Art

Referring to FIGS. 1 and 2, a conventional supporting apparatus for a workpiece feeding device 6 is shown to include a base 1 which is provided with a coupling member 1a secured thereon by a bolt 1b. An upright post 2 is disposed on the coupling member 1a so as to be rotatable relative to the base 1 upon releasing the coupling member 1a by operating the bolt 1b. A second coupling member 3 is sleeved on the upright post 2. A guiding post 4 is disposed on the second coupling member 3 parallel to the upright post 3, and has a first operating lever 4a which is operable to move the second coupling member 3 along the guiding post 4. A horizontal post 5 is disposed on the second coupling member 3, and has one end provided with a second operating lever 5a which is operable to move the horizontal post 5 in a horizontal direction relative to the second coupling member 3, and the other end to carry the workpiece feeding device 6. The base 1 is fixed on a worktable (A) such that a bottom of the workpiece feeding device 6 is proximate to the worktable (A). A workpiece can be placed to abut against an abutting plate (C) on the worktable (A) adjacent to the cutting tool (B), and can be fed by the workpiece feeding device 6 along a work path for cutting.

When it is desired to replace the worn cutting tool (B), the first coupling member 1a is first released to turn the upright post 2 so as to move the workpiece feeding device 6 away from the cutting tool (B) so as not to interfere replacement of the cutting tool (B). Then, the repositioning of the upright post 2 is required, which results in inconvenient operation since there is no means for repositioning the upright post 2. Moreover, since the first operating lever 4a and the workpiece feeding device 6 are disposed on the opposite ends of the horizontal post 5, the adjusting operation of the workpiece feeding device 6 in the horizontal direction is inconvenient to conduct.

SUMMARY OF THE INVENTION

The object of the present invention is to provide a supporting apparatus for a workpiece feeding device which is repositioned easily, and which permits convenient adjustment of the workpiece feeding device.

According to this invention, the repositionable supporting apparatus includes a lower post having a bottom end portion adapted to be fixedly secured relative to a worktable, and an upper end portion opposite to the bottom end portion in an axial direction. An upper post is disposed co-axially rotatable relative to the lower post around an axis parallel to the axial direction, and has an abutment end portion with a downward abutment wall which is disposed proximate to the upper end portion of the lower post, and an anchored end portion opposite to the abutment end portion in the axial direction. The downward abutment wall defines an upper cavity therein which extends upwardly and which is radially distant from the axis. A cantilever member has an anchoring end mounted on the anchored end portion of the upper post, and a holding end opposite to the anchoring end in a direction radial to the axial direction and adapted to carry a workpiece feeding device. A coupling member is disposed on the upper end portion of the lower post to couple the upper end portion with the abutment end portion of the upper post in a retained position where the upper post is prevented from rotation relative to the lower post, and in a released position where the upper post is rotatable relative to the lower post. The coupling member includes an upward abutment wall to slidably contact the downward abutment wall. The upward abutment wall defines a lower cavity therein which extends downwardly and which is aligned and in communication with the upper cavity. A spring-biased tumbler pin is disposed in and is movable relative to the lower cavity between a locked position where the tumbler pin protrudes into the upper cavity, and an unlocked position where the tumbler pin is retracted by depression of a depressing member to be flush with the upward abutment wall so as to permit sliding movement of the downward abutment wall relative to the upward abutment wall around the axis, thereby moving the workpiece feeding device away from a cutting tool on the worktable so as not to interfere with replacement of the cutting tool.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
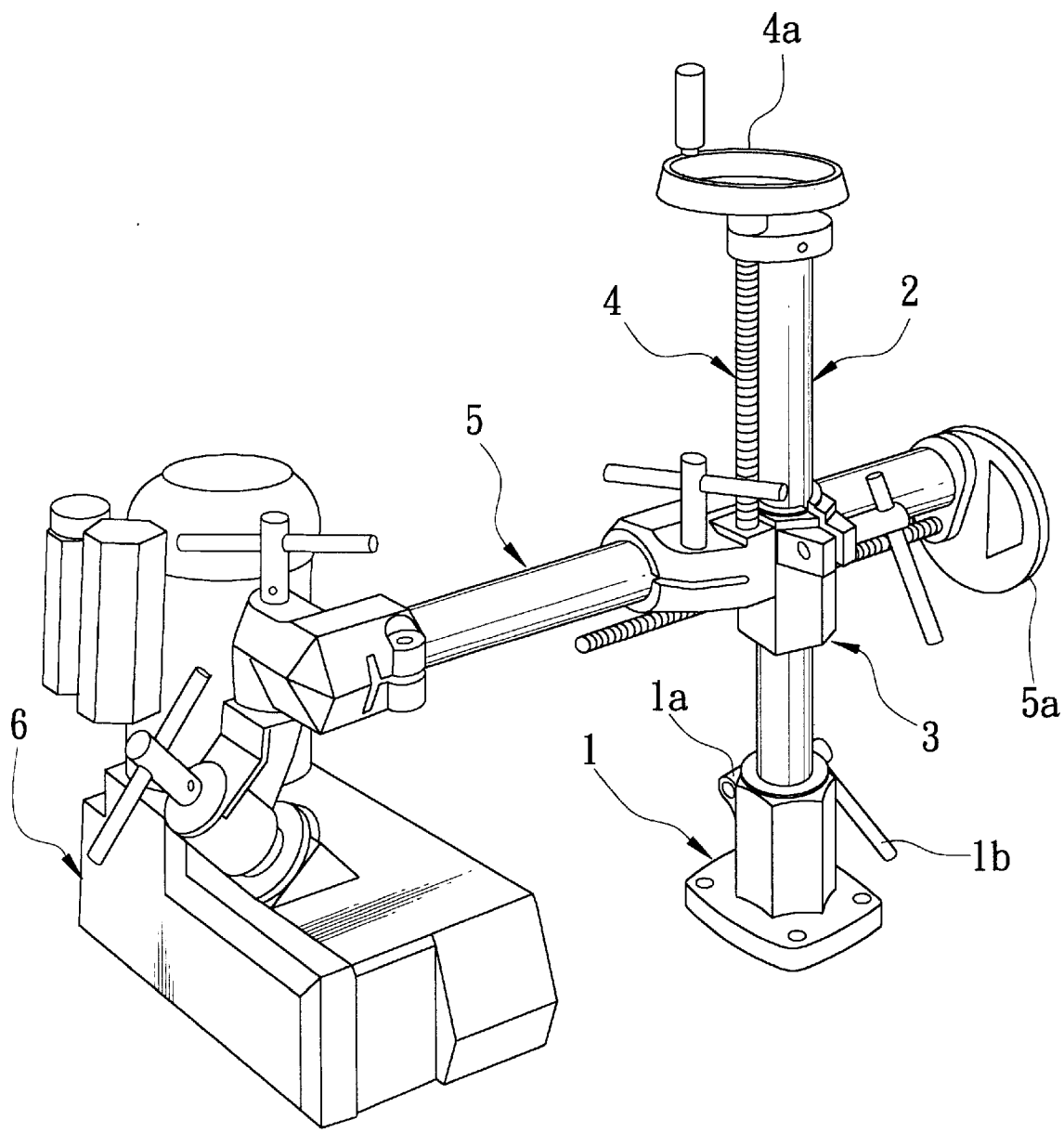
FIG. 1 is a perspective view of a conventional supporting apparatus for a workpiece feeding device.
Figure 2:
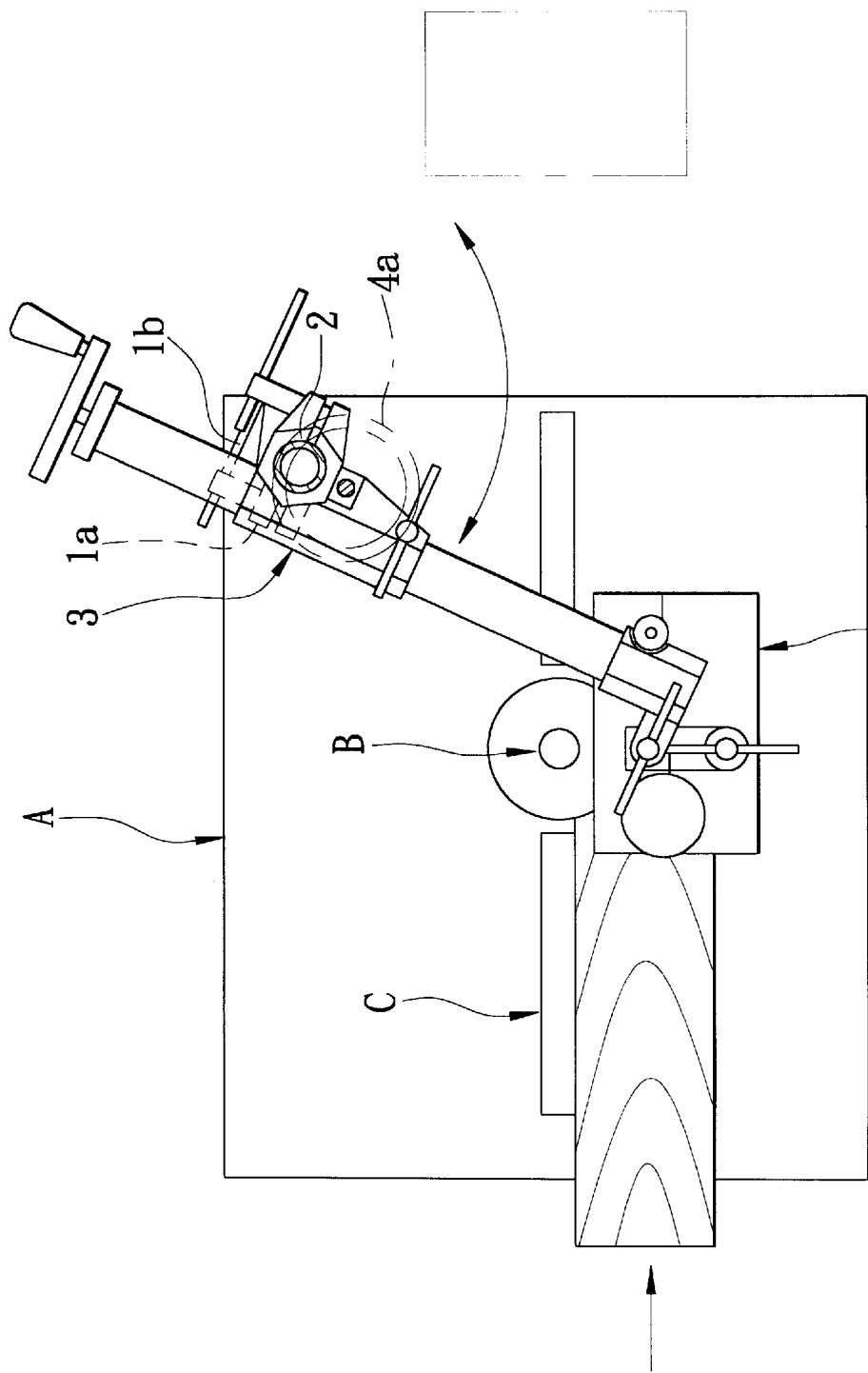
FIG. 2 is a top view of the conventional supporting apparatus.
Figure 3:
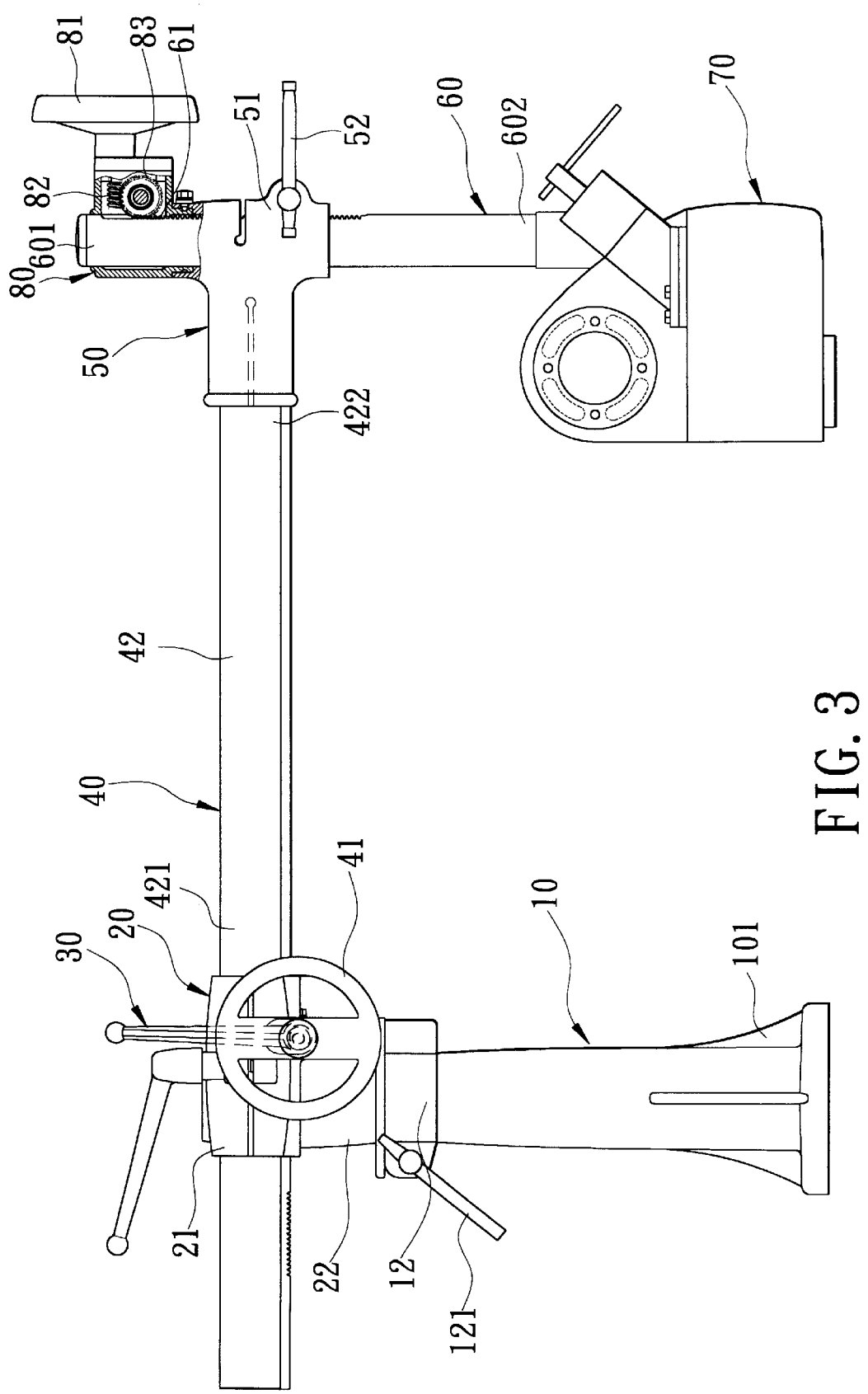
FIG. 3 is a schematic view of a first preferred embodiment of a repositionable supporting apparatus for a workpiece feeding device according to this invention.
Figure 4:
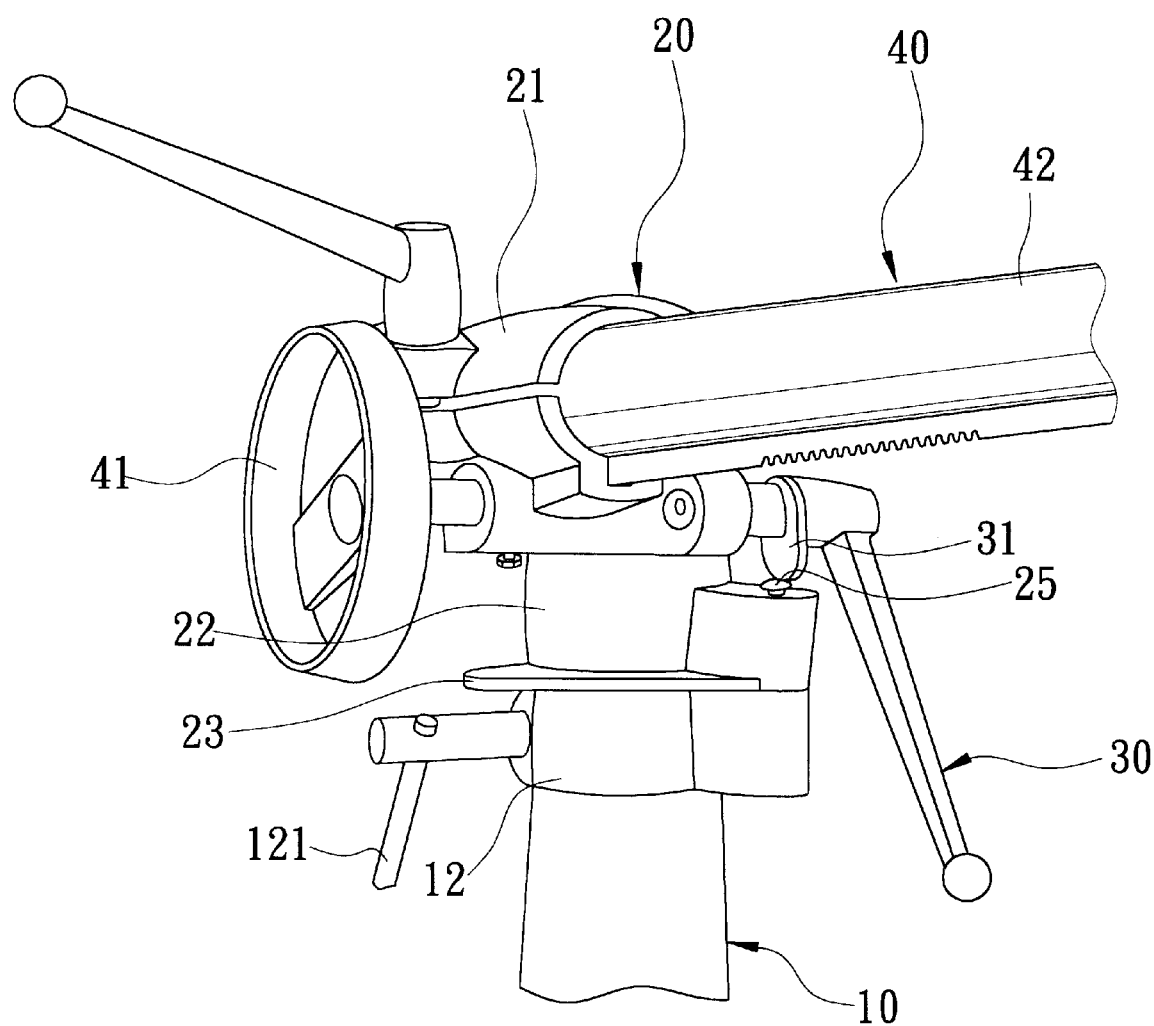
FIG. 4 is a perspective view of a portion of the first preferred embodiment.
Figure 5:
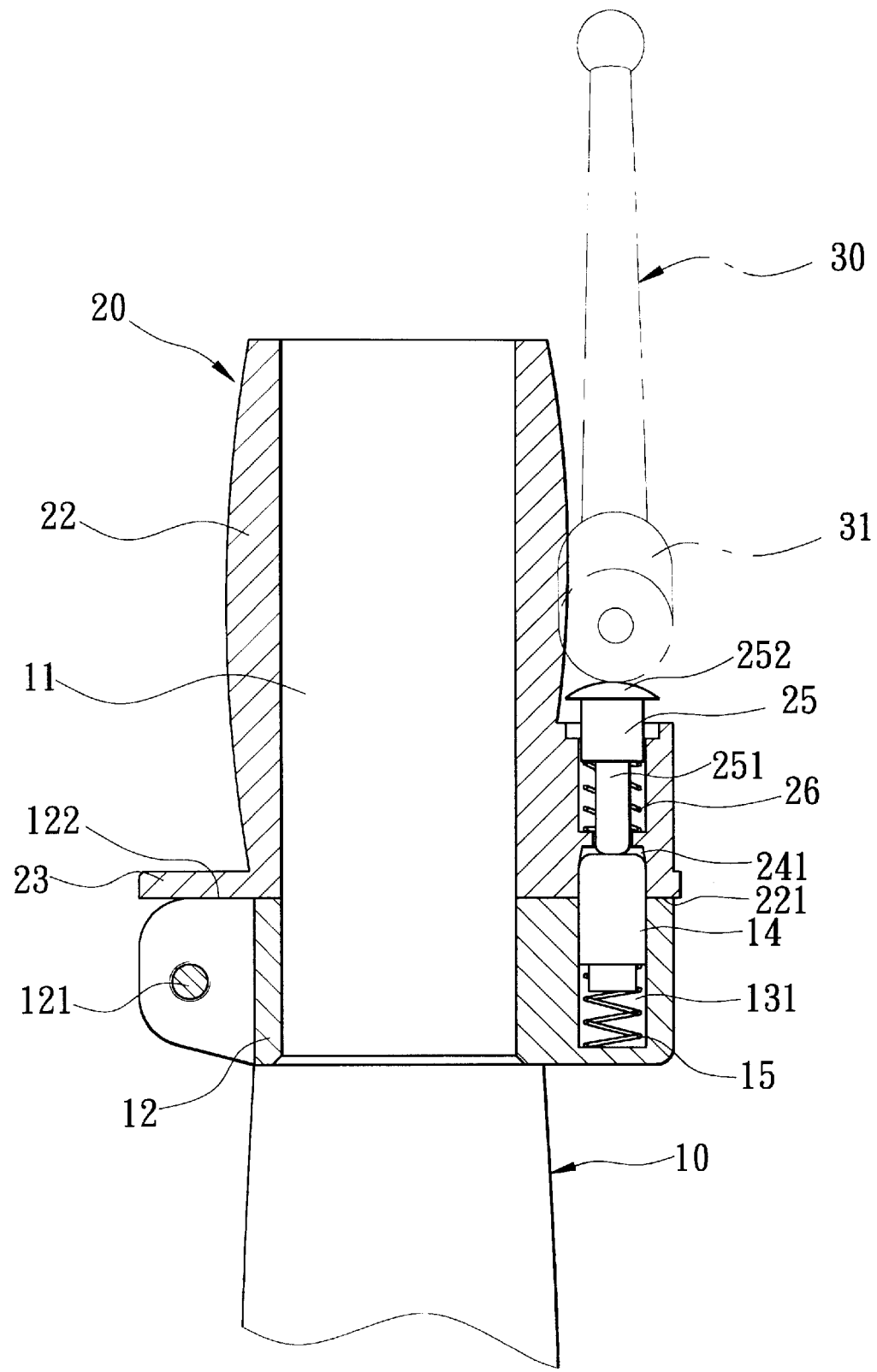
FIG. 5 is a sectional view of a portion of the first preferred embodiment in a locked state.

Referring to FIGS. 3, 4 and 5, the first preferred embodiment of the repositionable supporting apparatus according to the present invention is shown to comprise a lower post 10, an upper post 20, a cantilever member 40, and an upright post 60.

The lower post 10 has a bottom end portion 101 which is adapted to be fixedly secured on a worktable (not shown), and an upper end portion 11 opposite to the bottom end portion 101 in an axial direction. A coupling member 12 is sleeved on the upper end portion 11, and is fastened on and is releasable from the upper end portion 11 by means of a bolt 121. The coupling member 12 includes an upward abutment wall 122 which defines a lower cavity 131 therein extending downwardly and radially distant from the axis. A tumbler pin 14 is disposed in and is movable relative to the lower cavity 131. A first biasing member 15 is disposed in the lower cavity 131 to bias the tumbler pin 14 to protrude upwardly.

The upper post 20 includes a vertical tubular portion 22 and a horizontal tubular portion 21. The vertical tubular portion 22 is sleeved rotatably on the upper end portion 11 of the lower post 10 around an axis parallel to the axial direction, and has an abutment end portion with a downward abutment wall 221 which is disposed to slidably contact the upward abutment wall 122 of the coupling member 12. The downward abutment wall 221 defines an upper cavity 241 therein which extends upwardly and which is aligned and in communication with the lower cavity 131, and a retaining flange portion 23 which is formed around the axis. The horizontal tubular portion 21 is formed in a direction radial to the axial direction relative to the vertical tubular portion 22, and has an anchored end portion. As described above, the coupling member 12 couples the upper end portion 11 of the lower post 10 with the abutment end portion of the upper post 20 in a retained position where the upper post 20 is prevented from rotation relative to the lower post 10, and in a released position where the upper post 20 is rotatable relative to the lower post 10. In addition, the upward abutment wall 122 contacts slidably the downward abutment wall 221 such that the lower cavity 131 can be aligned with and communicated with the upper cavity 241. As such, the tumbler pin 14 is movable relative to the lower cavity 131 between a locked position where the tumbler pin 14 protrudes into the upper cavity 241, and an unlocked position where the tumbler pin 14 is retracted to be flush with the upward abutment wall 122 so as to permit sliding movement of the downward abutment wall 221 relative to the upward abutment wall 122 around the axis.

A depressing member is disposed to depress the tumbler pin 14 downwards and against the biasing action of the first biasing member 15. The depressing member includes a depressing pin 25 which has a stem end 251 disposed in and movable relative to the upper cavity 241 in the axial direction so as to depress the tumbler pin 14 downwards, and a head end 252 disposed opposite to the stem end 251 and extending outwardly of the upper cavity 241, a second biasing member 26 which is disposed in the upper cavity 241 to bias the stem end 251 of the depressing pin 25 upwards to move away from the downward abutment wall 221, and a handle 30 which is disposed on the upper post 20 and which has a cam 31 that is turnable to depress the head end 252 of the depressing pin 25 downwards and against the biasing action of the second biasing member 26.

The cantilever member 40 includes a horizontal post 42 which has an anchoring end 421 mounted on the anchored end portion of the horizontal tubular portion 21, and a holding end 422 disposed opposite to the anchoring end 421 in the radial direction and provided with a coupling seat 50. The horizontal post 42 is adjustable to move in the radial direction by means of an operating lever 41. The upright post 60 includes an upper portion 601 which passes through an anchoring portion 51 of the coupling seat 50 so as to be secured on and released from the anchoring portion 51 by operating a bolt 52, and a lower portion 602 which is disposed opposite to the upper portion 601 in the axial direction and which is adapted to carry a workpiece feeding device 70. A connecting member 80 is disposed between the upper portion 601 of the upright post 60 and the coupling seat 50, and has a gear mechanism disposed thereon. The gear mechanism includes an operating lever 81 which is disposed on the connecting member 80 and which has a worm 82, a worm gear 83 engaging the worm 82, and a bevel gear 61 formed on the upper portion 601 of the upright post 60 to engage the worm gear 83. When the upright post 60 is released from the coupling seat 50, the upright post 60 can be moved in the axial direction relative to the horizontal post 42 by rotating the operating lever 81.

Referring to FIGS. 3 and 5, to position the workpiece feeding device 70 on a worktable (not shown), the coupling member 12 is first released from the lower post 10 such that the coupling member 12, as well as the upper post 20, can be rotated about the axis relative to the lower post 10. As such, the cantilever member 40, the upright post 60 and the workpiece feeding device 70 are moved together with the upper post 20 so as to be located at a desired angular position. Then, the coupling member 12 is fastened on the upper end portion 11 of the lower post 10.

Figure 6:
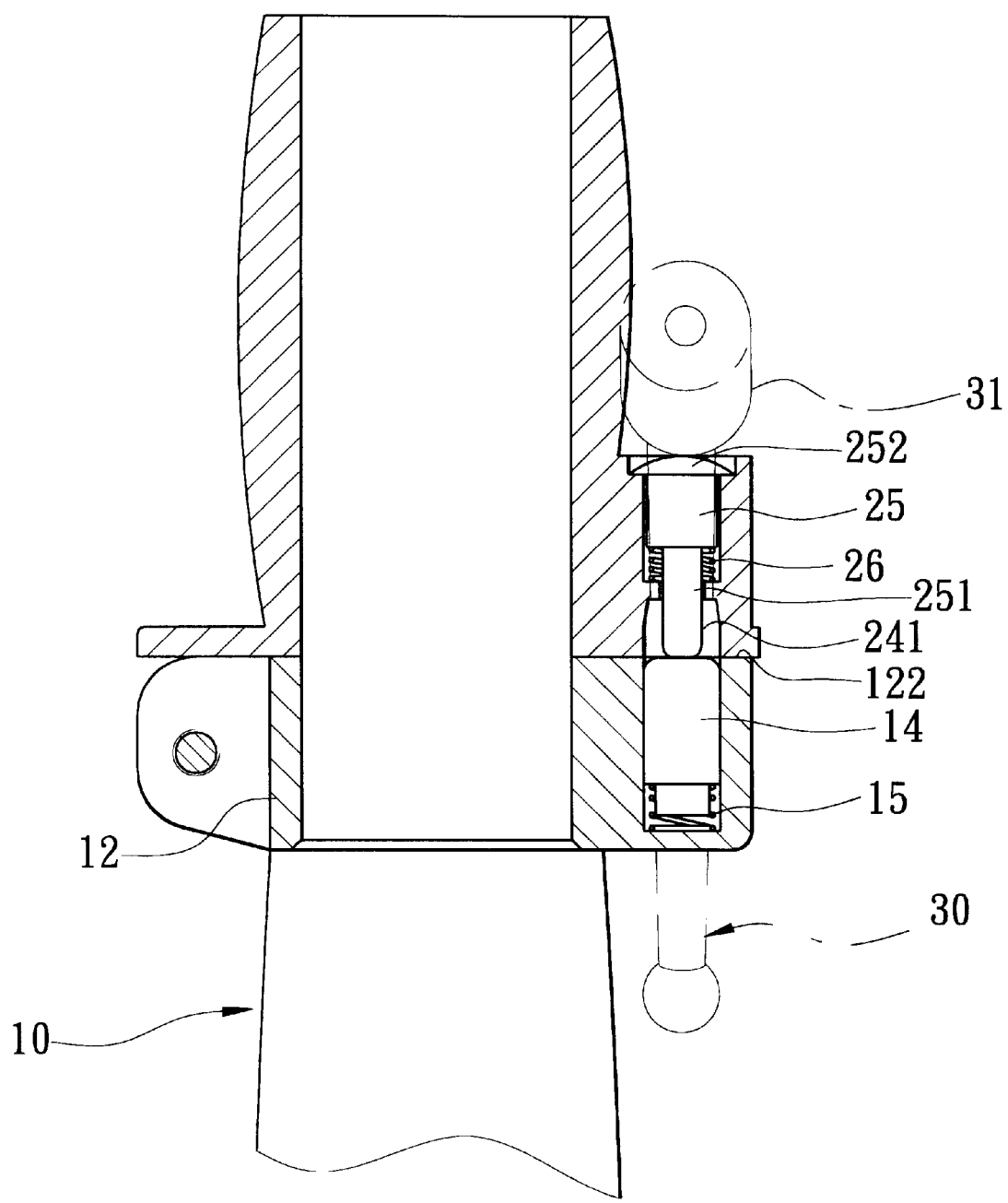
FIGS. 6 and 7 are sectional views of the portion of the first preferred embodiment in an unlocked state.
Figure 7:
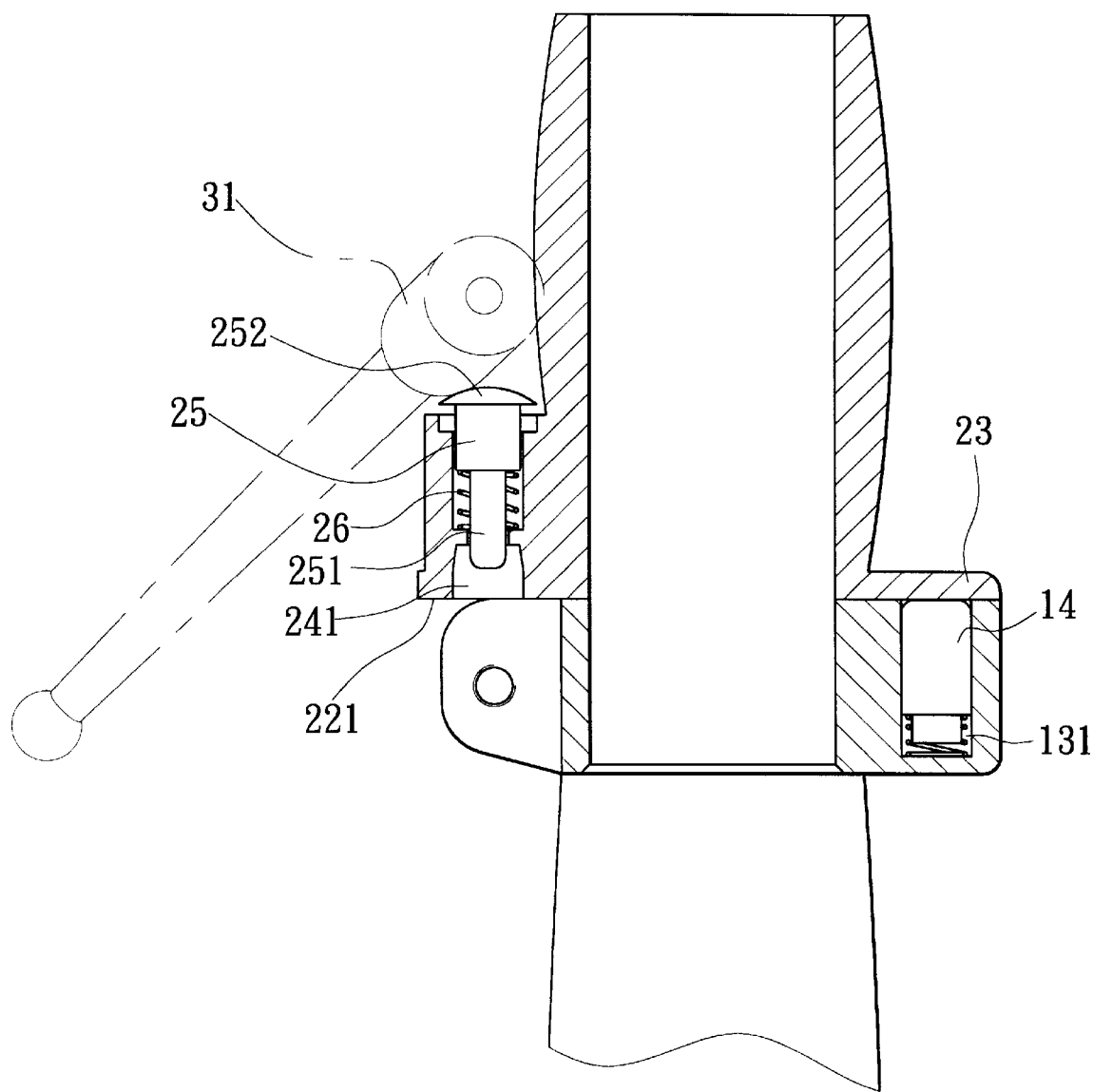

When it is desired to replace a worn cutting tool on the worktable, referring to FIG. 6, the handle 30 is first rotated counterclockwise about 180° such that the cam 31 depresses the head end 252 of the depressing pin 25 downwards against the biasing action of the second biasing member 26 to depress the tumbler pin 14 downwards. The tumbler pin 14 is then retracted to the unlocked position to be flush with the upward abutment wall 122. In this state, the sliding movement of the downward abutment wall 221 of the upper post 20 relative to the upward abutment wall 122 around the axis is permitted, thereby moving the workpiece feeding device 70 away from the cutting tool so as not to interfere with replacement of the worn cutting tool. During the sliding movement of the upper post 20, referring to FIG. 7, the tumbler pin 14 is retained to be flush with the upward abutment wall 122 by the retaining flange portion 23. In addition, by virtue of the biasing action of the second biasing member 26, the head end 252 can be moved slightly upwards to turn the cam 31 such that there is a clearance formed between the stem end 251 and the downward abutment wall 221.

After replacement of the cutting tool, the downward abutment wall 221 is moved slidably around the axis such that the upper and lower cavities 241, 131 are aligned with and are in communication with each other so as to permit the tumbler pin 14 to protrude into the upper cavity 241 to be in the locked position, as shown in FIG. 5. Finally, the handle 30 is turned clockwise to fasten the upper post 20 on the upper end portion 11 of the lower post 10.

As mentioned above, by the protruding movement of the tumbler pin 14 into the upper cavity 241 of the upper post 20, the upper post 20 can be repositioned easily after replacement of the cutting tool. In addition, since the operating lever 81 is disposed adjacent to the workpiece feeding device 70, the adjusting operation of the workpiece feeding device 70 is convenient to conduct.

Figure 8:
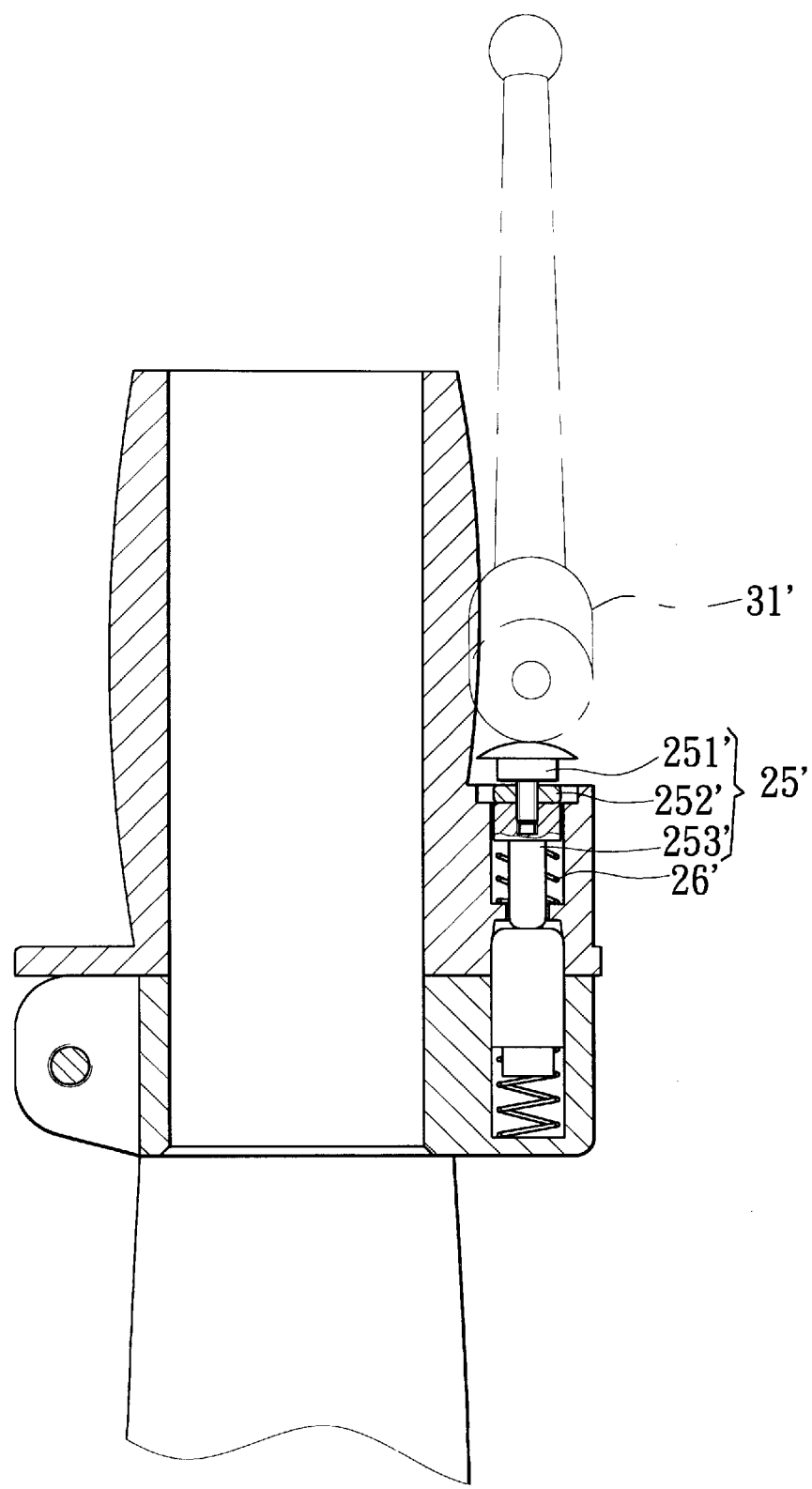
FIG. 8 is a sectional view of a portion of a second preferred embodiment of the repositionable supporting apparatus according to this invention in a locked state.

Referring to FIG. 8, the second preferred embodiment of the repositionable supporting apparatus according to this invention is shown to be similar to the first preferred embodiment in construction, except that the depressing pin 25' includes a screw bolt 251', a screw nut 252' engaging threadedly the screw bolt 251', and a depressing stem 253' which engages threadedly the screw bolt 251' at an upper section thereof and which passes through the second biasing member 26' at a lower section thereof. As such, when the depressing pin 25' is worn out by the cam 31' of the handle after a long term use, the screw bolt 251' can be raised threadedly relative to the depressing stem 253' so as to lengthen the depressing pin 25' to ensure proper contact with the cam 31'.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A repositionable supporting apparatus for a workpiece feeding device which is used to feed a workpiece along a work path on a worktable for a cutting tool to work thereon, said supporting apparatus comprising:

a lower post having a bottom end portion adapted to be fixedly secured relative to the worktable, and an upper end portion opposite to said bottom end portion in an axial direction;

an upper post disposed co-axially rotatable relative to said lower post around an axis parallel to the axial direction, and having an abutment end portion with a downward abutment wall disposed proximate to said upper end portion of said lower post, and an anchored end portion opposite to said abutment end portion in the axial direction, said downward abutment wall defining an upper cavity therein which extends upwardly and which is radially distant from said axis;

a cantilever member having an anchoring end mounted on said anchored end portion, and a holding end opposite to said anchoring end in a direction radial to the axial direction and adapted to carry the workpiece feeding device;

a coupling member disposed on said upper end portion of said lower post to couple said upper end portion with said abutment end portion in a retained position where said upper post is prevented from rotation relative to said lower post, and in a released position where said upper post is rotatable relative to said lower post, said coupling member including an upward abutment wall to slidably contact said downward abutment wall, said upward abutment wall defining a lower cavity therein which extends downwardly and which is aligned and in communication with said upper cavity;

a tumbler pin disposed in and movable relative to said lower cavity between a locked position where said tumbler pin protrudes into said upper cavity, and an unlocked position where said tumbler pin is retracted to be flush with said upward abutment wall so as to permit sliding movement of said downward abutment wall relative to said upward abutment wall around said axis, thereby moving the workpiece feeding device away from the cutting tool so as not to interfere with replacement of the cutting tool;

a first biasing member disposed to bias said tumbler pin to protrude into said upper cavity; and a depressing member disposed to depress said tumbler pin downwards and against biasing action of said first biasing member.

2. The repositionable supporting apparatus as claimed in claim 1, wherein said upper post is hollow and is sleeved rotatably on said upper end portion of said lower post.

3. The repositionable supporting apparatus as claimed in claim 2, wherein said depressing member includes a depressing pin having a stem end disposed in and movable relative to said upper cavity of said upper post in the axial direction so as to depress said tumbler pin downwards, and a head end disposed opposite to said stem end and extending outwardly of said upper cavity, a second biasing member disposed to bias said stem end of said depressing pin upwards to move away from said downward abutment wall, and a handle disposed on said upper post and turnable to depress said head end of said depressing pin downwards and against biasing action of said second biasing member.

4. The repositionable supporting apparatus as claimed in claim 3, wherein said depressing member further includes a retaining flange portion disposed on said downward abutment wall of said upper post so as to retain said tumbler pin to be flush with said upward abutment wall when said downward abutment wall is moved slidably relative to said upward abutment wall while said tumbler pin is in the unlocked position.

5. The repositionable supporting apparatus as claimed in claim 4, wherein said stem end of said depressing pin is adjustable in length.

6. The repositionable supporting apparatus as claimed in claim 1, further comprising an upright post having an upper portion disposed on and movable relative to said holding end of said cantilever member in the axial direction, and a lower portion disposed opposite to said upper portion in the axial direction and adapted to carry the workpiece feeding device.

7. The repositionable supporting apparatus as claimed in claim 6, further comprising a gear mechanism disposed between said holding end and said upper portion of said upright post so as to move said upright post relative to said holding end in the axial direction.

* * * * *